US009819246B2

(12) United States Patent
Ziegler et al.

(10) Patent No.: US 9,819,246 B2
(45) Date of Patent: Nov. 14, 2017

(54) ELECTRICAL MACHINE AND CONTROLLER AND METHODS OF ASSEMBLING THE SAME

(71) Applicant: Regal Beloit America, Inc., Beloit, WI (US)

(72) Inventors: William Arthur Ziegler, Jefferson City, MO (US); Katie D. Hamilton, Covington, OH (US); Paul Steven Mullin, Yellow Springs, OH (US); Jeffrey Jay Long, Purdy, MO (US); Michael David Smith, Rogers, AR (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 358 days.

(21) Appl. No.: 14/595,446

(22) Filed: Jan. 13, 2015

(65) Prior Publication Data
US 2016/0204676 A1 Jul. 14, 2016

(51) Int. Cl.
*A61H 33/08* (2006.01)
*H02K 9/06* (2006.01)
(Continued)

(52) U.S. Cl.
CPC ............. *H02K 9/06* (2013.01); *F24H 3/0405* (2013.01); *H02K 5/20* (2013.01); *H02K 9/02* (2013.01);
(Continued)

(58) Field of Classification Search
CPC . H02K 9/06; H02K 11/33; H02K 5/20; H02K 15/14; H02K 5/18; H02K 9/14;
(Continued)

(56) References Cited

U.S. PATENT DOCUMENTS 3,241,017 A    3/1966   Madsen et al.
3,990,014 A   11/1976   Hakozaki
(Continued)

FOREIGN PATENT DOCUMENTS

EP    1211787 B1    6/2002
EP    1372250 B1   12/2003

OTHER PUBLICATIONS

Non-Final Office Action dated Mar. 23, 2017; U.S. Appl. No. 14/595,523, filed Jan. 13, 2015; 14 pages.

*Primary Examiner* — Thor Campbell
(74) *Attorney, Agent, or Firm* — Armstrong Teasdale LLP

(57) ABSTRACT

An electrical machine includes a fan guard having a first air flow channel. A stator assembly is coupled to the fan guard and includes a stator yoke having a cylindrical outer surface and a stator pole shoe. The stator pole shoe includes a plurality of stator poles coupled to the stator yoke. The stator assembly includes a second air flow channel defined between the stator yoke and an adjacent pair of the stator poles. A rotor assembly is positioned inside the stator assembly. The rotor assembly includes a rotatable shaft and a rotor. The rotatable shaft defines a rotation axis. A control electronics board includes a plurality of heat making components and is enclosed in a housing having a vented base and a closure. The housing is coupled to the stator assembly opposite the fan guard. The vented base includes a plurality of vent openings opened toward the fan guard.

20 Claims, 12 Drawing Sheets

(51) Int. Cl.
*F24H 3/04* (2006.01)
*H05B 3/00* (2006.01)
*H02K 5/20* (2006.01)
*H02K 9/02* (2006.01)
*H02K 9/14* (2006.01)
*H02K 11/33* (2016.01)

(52) U.S. Cl.
CPC .............. *H02K 9/14* (2013.01); *H02K 11/33* (2016.01); *H05B 3/0014* (2013.01)

(58) Field of Classification Search
CPC .... H02K 19/103; H02K 1/148; H02K 1/2733; H02K 2211/03; H02K 9/02
See application file for complete search history.

(56) References Cited

U.S. PATENT DOCUMENTS

| | | | |
|---|---|---|---|
| 4,506,201 A | 3/1985 | Tsuneki | |
| 4,510,266 A | 4/1985 | Eertink | |
| 4,553,075 A * | 11/1985 | Brown | F04D 25/0606 310/63 |
| 4,563,622 A * | 1/1986 | Deavers | H02K 29/08 310/156.12 |
| 4,755,728 A * | 7/1988 | Ban | H02K 29/08 318/400.11 |
| 4,876,492 A * | 10/1989 | Lester | F01P 7/164 310/62 |
| 5,402,024 A * | 3/1995 | Watanabe | H02K 1/2733 310/156.12 |
| 5,552,689 A | 9/1996 | Matoba et al. | |
| 5,648,892 A | 7/1997 | Wieloch et al. | |
| 5,907,475 A | 5/1999 | Babinski et al. | |
| 5,910,694 A * | 6/1999 | Yokozawa | F04D 29/582 310/58 |
| 6,144,131 A * | 11/2000 | Hollenbeck | H02K 1/276 310/156.53 |
| 6,360,703 B1 * | 3/2002 | Rahbar | F01P 5/04 123/41.49 |
| 6,380,757 B1 | 4/2002 | Draves et al. | |
| 6,608,411 B2 * | 8/2003 | Horng | H02K 3/26 310/207 |
| 6,671,459 B1 | 12/2003 | Bultman et al. | |
| 6,784,584 B2 * | 8/2004 | Knoll | H02K 1/146 310/179 |
| 6,819,074 B2 | 11/2004 | Yoo et al. | |
| 6,936,989 B2 | 8/2005 | Hogan | |
| 7,262,523 B1 | 8/2007 | Faizullabhoy et al. | |
| 8,267,673 B1 * | 9/2012 | Pairaktaridis | H02K 9/06 310/62 |
| 8,639,417 B2 | 1/2014 | Illg et al. | |
| 8,760,017 B2 * | 6/2014 | Henke | H02K 9/06 310/62 |
| 8,853,984 B2 | 10/2014 | Yeh | |
| 9,088,227 B2 | 7/2015 | Murata et al. | |
| 9,112,386 B2 * | 8/2015 | Roopnarine | H02K 1/148 |
| 9,367,046 B2 | 6/2016 | Murata et al. | |
| 9,467,030 B2 * | 10/2016 | Camilleri | H02K 15/14 |
| 2003/0102765 A1 * | 6/2003 | Knoll | H02K 1/146 310/179 |
| 2006/0022529 A1 * | 2/2006 | De Filippis | F04D 25/082 310/58 |
| 2008/0112697 A1 | 5/2008 | Kim et al. | |
| 2009/0135560 A1 * | 5/2009 | Hill | F04D 29/281 361/695 |
| 2009/0324205 A1 | 12/2009 | Lambrechts et al. | |
| 2012/0001505 A1 * | 1/2012 | Henke | H02K 9/06 310/62 |
| 2012/0112524 A1 | 5/2012 | Shibata et al. | |
| 2014/0044466 A1 | 2/2014 | Murata et al. | |
| 2014/0127632 A1 | 5/2014 | Garrison et al. | |
| 2014/0265664 A1 * | 9/2014 | Camilleri | H02K 15/14 310/59 |
| 2015/0234362 A1 | 8/2015 | Murata et al. | |
| 2016/0079824 A1 * | 3/2016 | McKinzie | H02K 5/20 310/63 |
| 2017/0093264 A1 * | 3/2017 | Li | H02K 1/146 |

\* cited by examiner

ELECTRICAL MACHINE AND CONTROLLER AND METHODS OF ASSEMBLING THE SAME

BACKGROUND

The embodiments described herein relate generally to electrical machines, and more particularly, to electrical machines including an integrated fan for use in cooling the control electronics and the stator assembly of the electrical machine.

In some known high efficiency furnaces, standard chimney air-draw effects are not sufficient to assure the required air flow through the furnace heat exchangers, and therefore, some known high efficiency furnaces utilize draft inducers to provide sufficient air flow through the heat exchangers of the furnace.

In such known draft inducers, it is common to provide a draft inducer including a blower housing and a blower wheel that is driven by an electric motor mounted to the housing. The electric motor includes a shaft providing a driving connection with the blower wheel within the draft inducer housing. Such known furnaces use such draft inducer blowers to draw the combustion air through the heat exchanger and force it up the chimney. Such known electric motors are exposed to ambient air temperatures in the range of 150 to 175 degrees Fahrenheit. Furthermore, the rotor shaft of the electric motor extends into the blower housing and is exposed to air temperatures in the range of 400 to 450 degrees Fahrenheit. Thus, such known draft inducers are typically manufactured from metal.

In some known draft inducers, the electric motor is mounted directly to the blower housing and the bearing nearest the blower housing is exposed to an excessive amount of heat both radiated from the surface of the blower housing and conducted through the shaft of the motor. Some known draft inducers space the electric motor away from the blower housing and add a fan to the motor shaft between the motor and blower. The fan blade introduces air movement axially through the electric motor and across the surface of the housing. Such known systems are only marginal in controlling shaft end bearing temperatures because air is drawn along the outer portion of the stator assembly where it cannot effectively cool the motor. The hot air is thrown radially from the fan blade, but the hot air recirculates around the motor and reduces the effectiveness of the system.

BRIEF DESCRIPTION

In one aspect, an electrical machine is provided. The electrical machine includes a fan guard positioned at a first end of the electrical machine. The fan guard includes a first air flow channel therethrough. The electrical machine also includes a stator assembly coupled to the fan guard and includes a stator yoke having a cylindrical outer surface and a stator pole shoe including a plurality of stator poles coupled to the stator yoke. The stator assembly further includes a second air flow channel defined between the stator yoke and an adjacent pair of stator poles. The electrical machine further includes a rotor assembly positioned inside the stator assembly. The rotor assembly includes a rotatable shaft and a rotor coupled thereto. The rotatable shaft defines a rotation axis of the electrical machine. A control electronics board is included and has a plurality of heat making components. The electrical machine includes a housing having a vented base and a closure. The housing is coupled to the stator assembly at a second end of the electrical machine opposite the first end. The housing is configured to enclose the control electronics board. The vented base includes a plurality of vent openings opened toward the first end.

In another aspect, a furnace system is provided. The furnace system includes a furnace having a plurality of heater elements. The system also includes an electrical machine. The electrical machine includes a fan guard positioned at a first end of the electrical machine. The fan guard includes a first air flow channel therethrough. The electrical machine also includes a stator assembly coupled to the fan guard and includes a stator yoke and a stator pole shoe including a plurality of stator poles coupled to the stator yoke. The stator assembly further includes a second air flow channel defined between the stator yoke and an adjacent pair of stator poles. The electrical machine further includes a rotor assembly positioned inside the stator assembly. The rotor assembly includes a rotatable shaft and a rotor coupled thereto. The rotatable shaft defines a rotation axis of the electrical machine. A control electronics board is included and has a plurality of heat making components. The electrical machine includes a housing having a vented base and a closure. The housing is coupled to the stator assembly at a second end of the electrical machine opposite the first end. The housing is configured to enclose the control electronics board. The vented base includes a plurality of vent openings opened toward the first end. The system further includes a blower assembly coupled to the first end of the electrical machine.

In yet another aspect, a method of assembling an electrical machine is provided. The method includes providing a fan guard having a first air flow channel formed therethrough and a lattice wall. The method also includes coupling a stator assembly to the fan guard. The stator assembly includes a stator yoke and a stator pole shoe including a plurality of stator poles coupled to the stator yoke. The stator assembly further includes a second air flow channel defined between the stator yoke and an adjacent pair of stator poles of the plurality of stator poles. The method includes positioning a rotor assembly inside the stator assembly. The rotor assembly includes a rotatable shaft defining a rotation axis. Furthermore, the method includes coupling a housing including a vented base and a closure to the stator assembly opposite the fan guard. The vented base includes a plurality of vent openings opened toward the fan guard. Moreover, the method includes coupling a control electronics board within the housing, and coupling a fan to the rotatable shaft. The fan is enclosed by the lattice wall of the fan guard. In addition, the method includes rotating the fan to draw air through the plurality of vent openings, the second air flow channel, and the first air flow channel.

Although specific features of various embodiments may be shown in some drawings and not in others, this is for convenience only. Any feature of any drawing may be referenced and/or claimed in combination with any feature of any other drawing.

DETAILED DESCRIPTION

Embodiments of the system described herein cool an electrical machine using air that is drawn into a control electronics housing from around the stator assembly of the electrical machine using a fan that is driven by the electrical machine. More specifically, embodiments of the system draw air into the housing in a substantially axial direction away from the fan. The air impinges on the heat making components of the control electronics board before turning in a direction transverse to the axial direction of the electrical machine. The air moves across the control electronics board toward the stator assembly where it turns in an axial direction towards the fan. The air passes through air channels formed in the stator assembly, through the fan, and is vented radially outward of a fan guard surrounding the fan. Accordingly, the system enables the electrical machine to be fabricated in a compact manner, such that the control electronics board is mounted to a rear portion of the stator assembly and the heat making components extend axially away from the control electronics board toward the fan. The air flow is channeled through the electrical machine in a 180 degree path. Additional features of the system are described in more detail herein.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "axial" and "axially" refer to directions and orientations extending substantially parallel to a longitudinal axis of the electrical machine. The terms "radial" and "radially" refer to directions and orientations extending substantially perpendicular to the longitudinal axis of the electrical machine. In addition, as used herein, the terms "circumferential" and "circumferentially" refer to directions and orientations extending arcuately about the longitudinal axis of the electrical machine.

Figure 1:
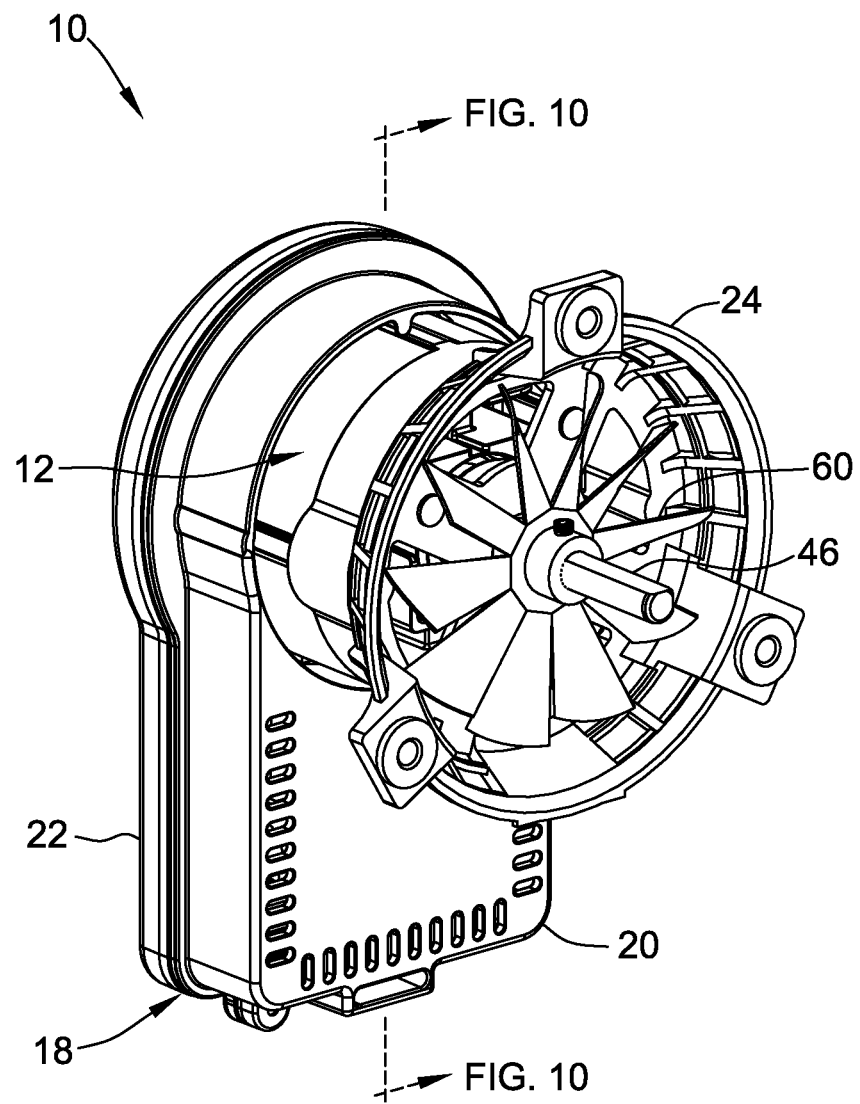
FIG. 1 is a schematic perspective of an exemplary electrical machine.
Figure 2:
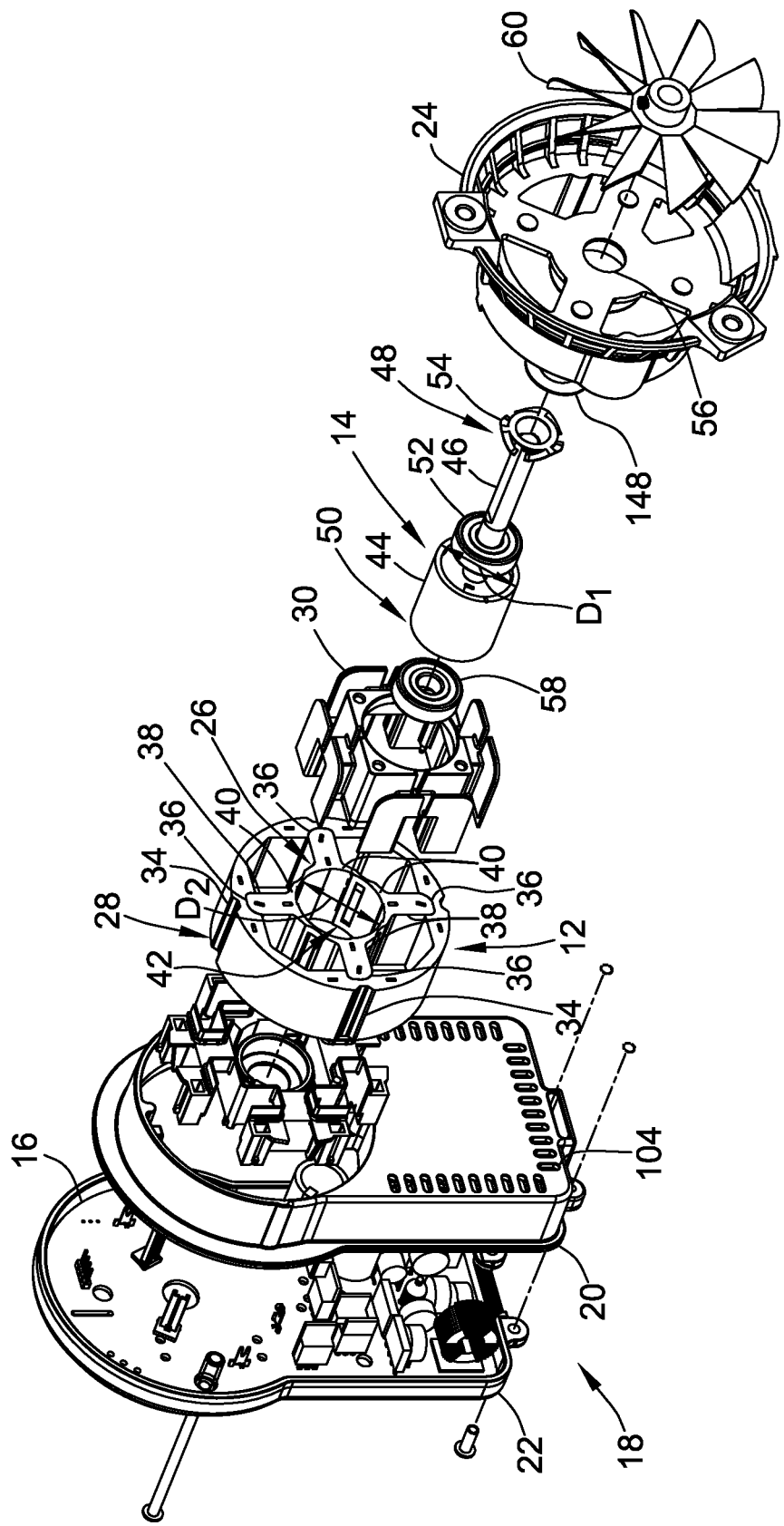
FIG. 2 is an exploded view of the electrical machine shown in FIG. 1.
Figure 3:
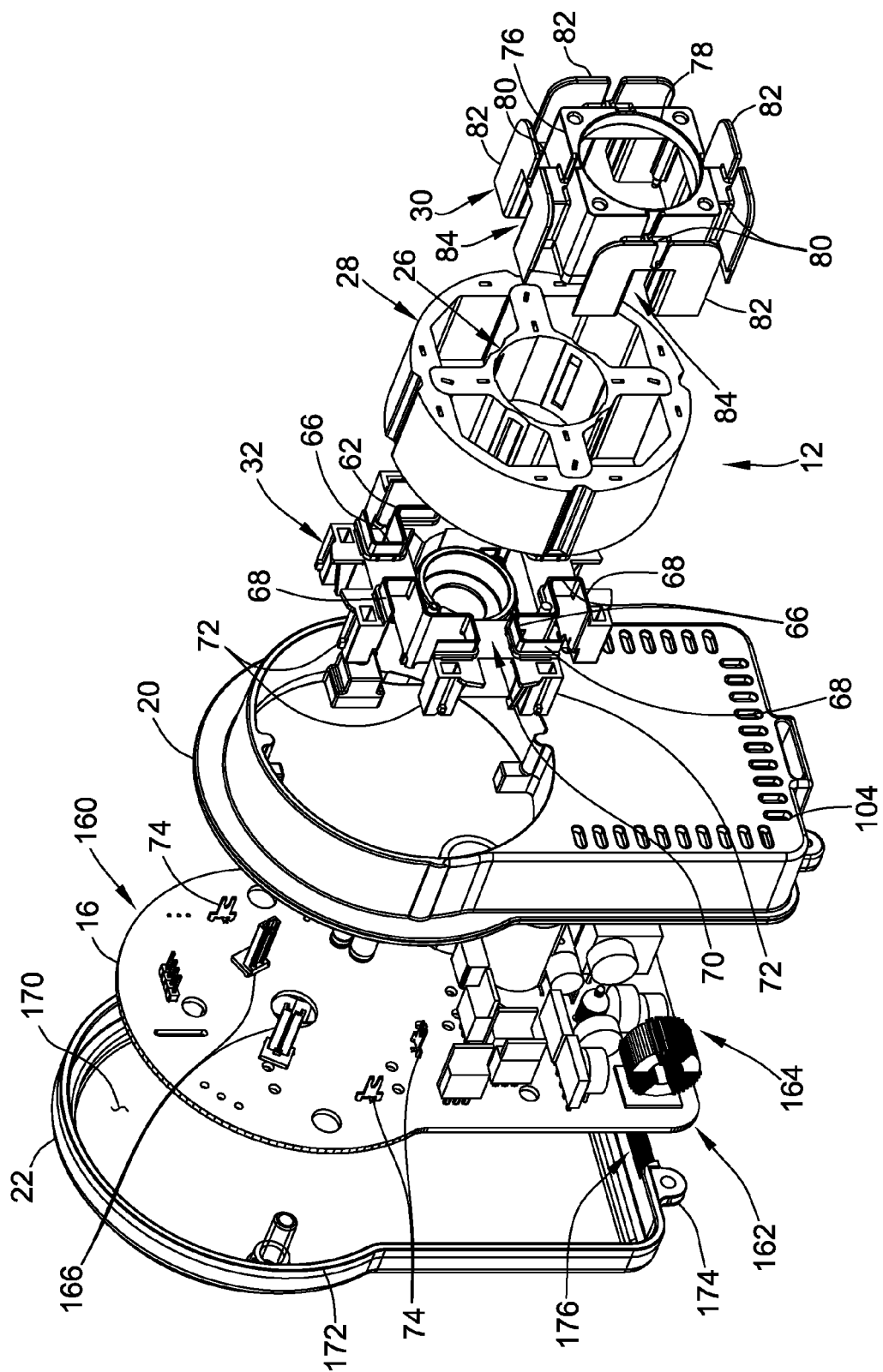
FIG. 3 is an enlarged exploded view of FIG. 2 detailing a stator assembly, a control electronics board, and a housing of the exemplary electrical machine.

FIG. 1 is a schematic perspective of an exemplary electrical machine 10. FIG. 2 is an exploded view of electrical machine 10 shown in FIG. 1. FIG. 3 is an enlarged exploded view of FIG. 2 detailing a stator assembly 12, a control electronics board 16, and a housing 18 of exemplary electrical machine 10. In the exemplary embodiment, electrical machine 10 is a draft inducer and includes stator assembly 12, rotor assembly 14, control electronics board 16 for controlling operation of electrical machine 10, housing 18 including a vented base 20 and a closure 22, and a fan guard 24. Housing 18 is configured to couple to at least a portion of stator assembly 12 and enclose control electronics board 16 and other various members of electrical machine 10.

Stator assembly 12 is fabricated in part from at least two subassemblies 24 and 26. The first subassembly includes a stator yoke 28 and the second subassembly comprises a pole shoe 26. In addition, stator assembly 12 includes a first rigid insulating support 30 and a second rigid insulating support 32. Rigid insulating supports 30 and 32 are configured to sandwich pole shoe 26 therebetween, as is described further herein.

In the exemplary embodiment, stator yoke 28 is fabricated from a plurality of laminations (not shown) in the form of toroidal plates stacked one on top of the other. Alternatively, stator yoke 28 may be a solid yoke stator. A solid yoke can be a complete, one-piece component, or can include multiple non-laminated sections coupled together to form a complete solid yoke. Stator yoke 28 is fabricated from a magnetic material, such as, for example, a steel or a steel alloy. Alternatively, stator yoke 28 is fabricated from any ferromagnetic material that enables electrical machine 10 to function as described herein, such as, for example, a Soft Magnetic Alloy (SMA) or a Soft Magnetic Composite (SMC) material. The use of SMA or SMC materials in a solid yoke enable 3-dimensional flux paths and facilitate reducing high frequency losses (e.g., losses at frequencies above 60 Hz) when compared with laminated stator yokes. The use of SMC or SMA materials also facilitates increasing the structural rigidity of stator yoke 28, which facilitates improving performance and minimizing noise. In the exemplary embodiment, stator yoke 28 includes on its cylindrical outer surface a plurality of external grooves 34 configured to engage vented base 20 of housing 18 and fan guard 24. Thus, when assembled, stator assembly 12 is located axially between housing 18 and fan guard 24, and is assembled integral therewith. Furthermore, stator yoke 28 includes on its inner surface a plurality of internal grooves 36 configured to engage pole shoe 26.

In the exemplary embodiment, pole shoe 26 is fabricated from a plurality of laminations (not shown), stacked one on top of the other. Alternatively, pole shoe 26 may be a solid pole shoe. A solid pole shoe can be a complete, one-piece component, or can include multiple non-laminated sections coupled together to form a complete solid pole shoe. Pole shoe 26 is fabricated from a magnetic material, such as, for example, a steel or a steel alloy. Alternatively, pole shoe 26 is fabricated from any ferromagnetic material that enables electrical machine 10 to function as described herein, such as, for example, an SMA or an SMC material. In the exemplary embodiment, pole shoe 26 includes a plurality of poles 38 extending radially outward from respective pole shoes 40. In the exemplary embodiment, pole shoe 26 includes four poles 38. Alternatively, pole shoe 26 includes any number of poles 38 that enable electrical machine 10 to function as described herein. In the exemplary embodiment, pole shoes 40 are arc-shaped so as to define a cylindrical-shaped axial hole 42 configured to receive rotor assembly 14 and define an air gap therewith. A radially outer end portion of each pole 38 is formed in a shape complementary to recess groove 36 stator yoke 28, such that pole shoe 26 engages the inside of stator yoke 28.

In the exemplary embodiment, rotor assembly 14 includes a rotor 44 coupled to a rotatable shaft 46. Rotor 44 is substantially cylindrical in shape having an outside diameter D1 smaller than an inside diameter D2 of axial hole 42 in stator assembly 12. The difference between D1 and D2 defines the air gap of electrical machine 10. In the exemplary embodiment, rotor 44 is a permanent-magnet rotor and includes a plurality of permanent magnets (not shown). Alternatively, rotor 44 is any type of rotor that enables electrical machine 10 to function as described herein. In the exemplary embodiment, rotatable shaft 46 is fixedly coupled to rotor 44 and positioned axially therethrough defining a first end 48 that extends forward from rotor 44 and a shorter second end 50 that extends rearward from rotor 44.

In the exemplary embodiment, first end 48 of rotatable shaft 46 engages in a first bearing 52. When assembled, first bearing 52 is fixed with a spring 54 inside fan guard 24. First end 48 of rotatable shaft 46 extends through bearing 54 axially out of a shaft hole 56 of fan guard 24. A fan 60 is coupled to first end 48 of rotatable shaft 46. Fan 60 is configured to draw air through electrical machine 10.

As shown in FIG. 3, in the exemplary embodiment, second rigid insulating support 32 includes a central square-shaped body 62 having a circular bearing seat 64 configured to receive a bearing 58 (shown in FIG. 2). Bearing 58 is fixed or pressed into bearing seat 64 and is configured to receive second end 50 (shown in FIG. 2) of rotatable shaft 46 (shown in FIG. 2). Extending radially outward from body 62 are a plurality of bridges 66 having respective flanges 68 extending substantially parallel to a respective side of body 62. Each bridge 66 defines a recess 70 configured to receive a respective pole 38 of pole shoe 26. Further, each flange 68 includes at least one latch mechanism 72 configured to engage a corresponding fork pin 74 coupled to control electronics board 16. In the exemplary embodiment, latch mechanism 72 includes a Mag-Mate terminal (Mag-Mate is manufactured by AMP, Inc.) that is pressingly inserted into latch mechanism 72 for electrically coupling to a winding (not shown). The Mag-Mate terminal is known and is formed in a substantially "U" shape including a resilient clip whose one side leading end portion is bent inwards and is configured to slidingly engage fork pin 74. In at least some embodiments, second rigid insulating support 32 is manufactured from a nonconductive material, for example molded plastic. Second rigid insulating support 32, however, may be fabricated from any material that enables electric machine 10 to function as described herein. Furthermore, second rigid insulating support 32 may be formed using any other suitable manufacturing process to fabricate second rigid insulating support 32.

In the exemplary embodiment, the first rigid insulating support 30 is substantially similar to second rigid insulating support 32, except that first rigid insulating support 32 includes a square-shaped body 76 open at the front and at the rear so as to define an opening 78 configured to receive rotor 44. Extending radially outward from body 76 are a plurality of bridges 80 having respective flanges 82 extending substantially parallel to a respective of body 76. Each bridge 80 defines a recess 84 that corresponds to a recess 70 in second rigid insulating support 32 and is configured to receive a respective pole 38 of pole shoe 26. In at least some embodiments, first rigid insulating support 30 is manufactured from a nonconductive material, for example molded plastic. First rigid insulating support 30, however, may be fabricated from any material that enables electric machine 10 to function as described herein. Furthermore, first rigid insulating support 30 may be formed using any other suitable manufacturing process to fabricate first rigid insulating support 30.

While each of body 76 and body 62 of first rigid insulating support 30 and second rigid insulating support 32 are described herein an square-shaped, it is noted that body 76 and body 62 can have any shape and number of sides that enable electrical machine 10 to function as descried herein. For example, without limitation, in one embodiment, each of body 76 and body 62 has 6 sides which correspond to a 6 pole electrical machine.

Figure 4:
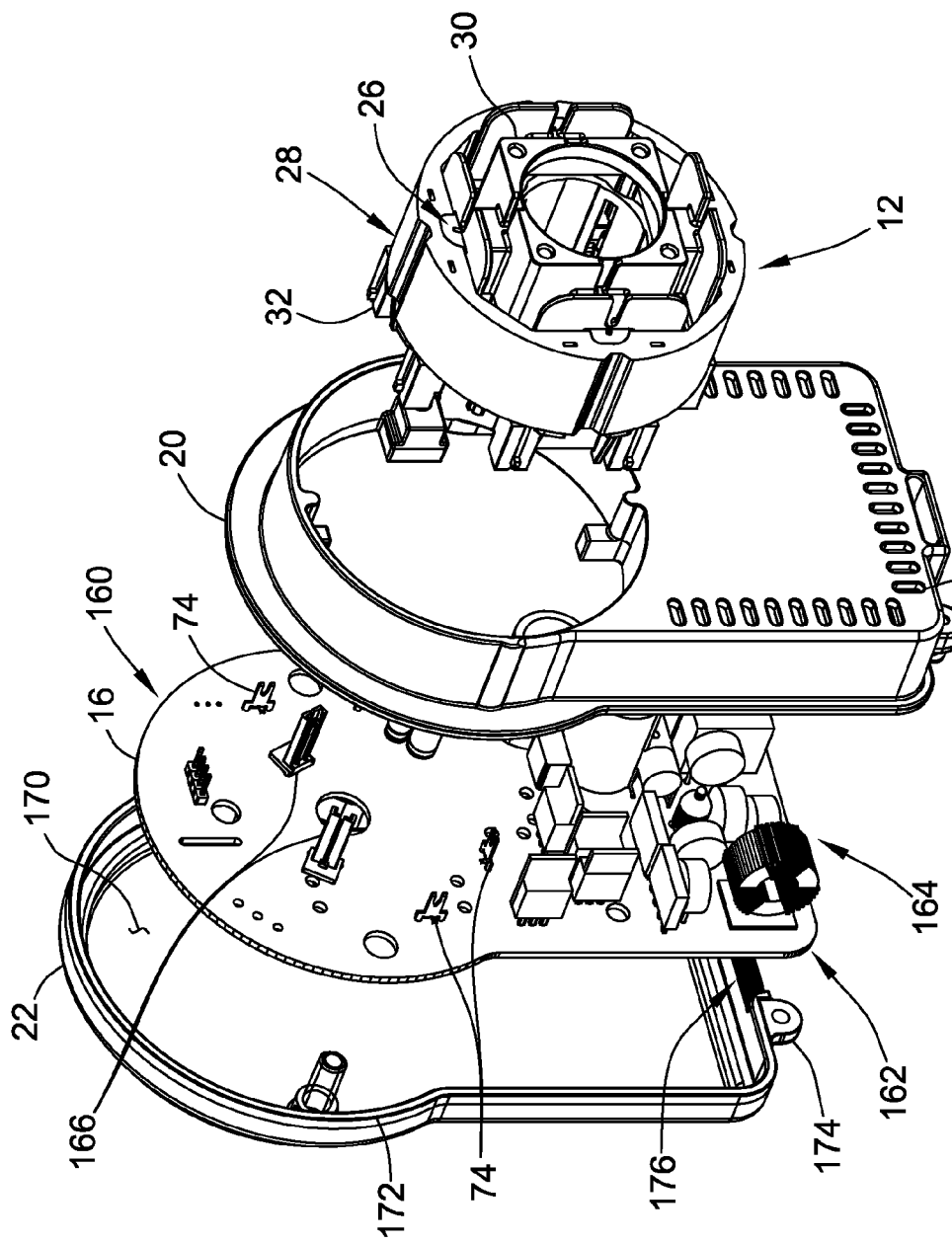
FIG. 4 is an enlarged exploded view of FIG. 2 showing the assembled stator assembly, the control electronics board, and the housing of the exemplary electrical machine.

FIG. 4 is an enlarged exploded view of FIG. 2 showing assembled stator assembly 12, control electronics board 16, and housing 18 of exemplary electrical machine 10. As shown in FIG. 4, pole shoe 26 is sandwiched between first rigid insulating support 30 and second rigid insulating support 32, so that each of poles 38 are received in respective recesses 70 and 84 of bridges 66 and 80 respectively. Furthermore, each of pole shoes 40 are received in bodies 62 and 76 of first rigid insulating support 30 and second rigid insulating support 32 respectively. In operation, an automatic winding machine (not shown) winds a conductor wire (not shown) on bridges 66 and 80 to form stator windings (not shown). Thus, the stator windings are formed around poles 38 of pole shoe 26. Pole shoe 26 is inserted into stator yoke 28 so that the end portions of pole 38 engage grooves 36 of stator yoke 28, thereby form stator assembly 12.

Figure 5:
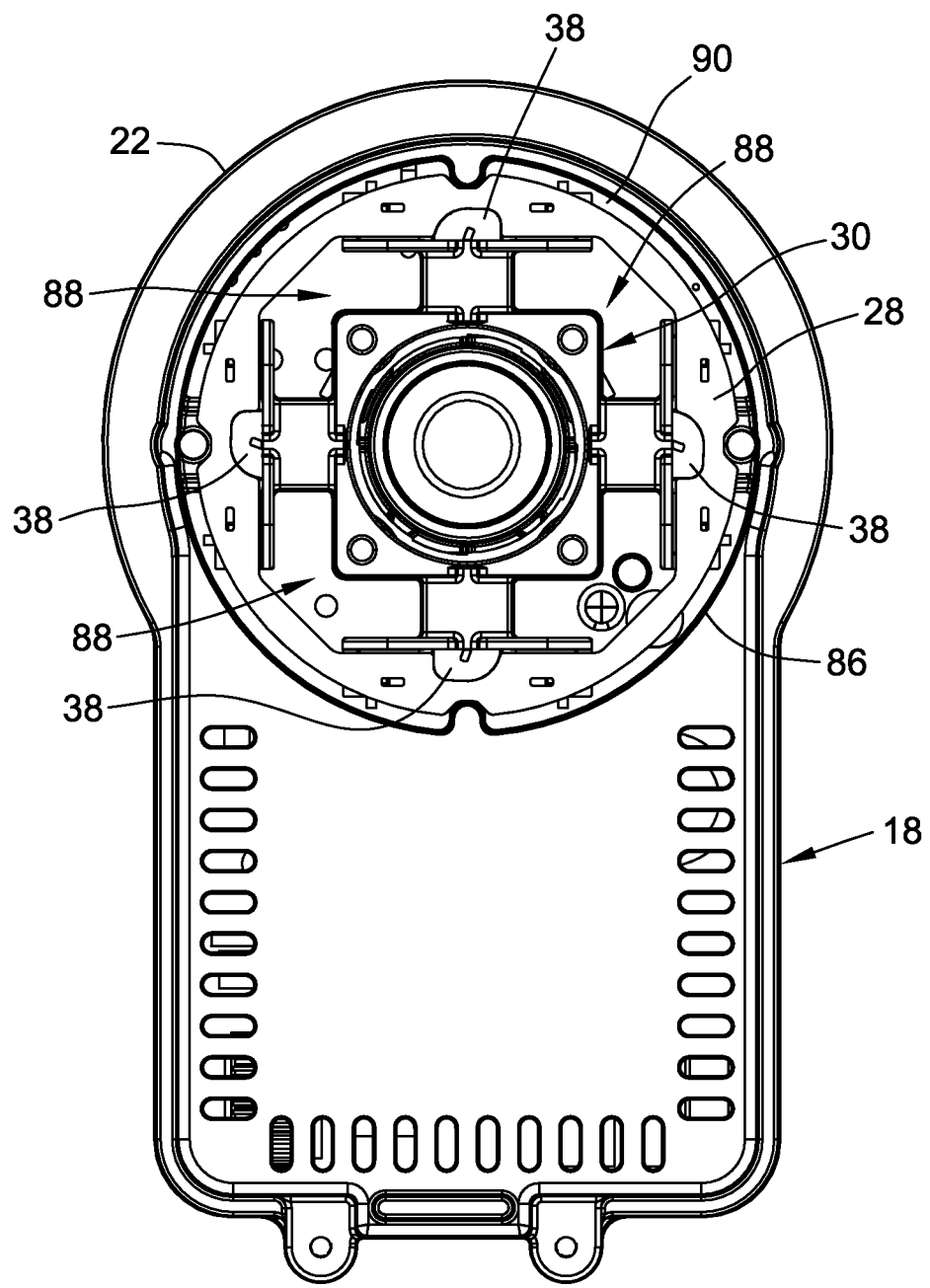
FIG. 5 is an end view of the electrical machine shown in FIG. 4 showing the stator assembly mounted to a vented base of the housing.

FIG. 5 is an end view of electrical machine 10 shown in FIG. 4 showing stator assembly 12 mounted to vented base 20 of housing 18. Stator assembly 12 is configured to enable air to pass through stator assembly 12 to facilitate cooling. In the exemplary embodiment, vented base 20 includes a substantially circular stator opening 86 configured to receive stator assembly 12. An air gap 90 is defined between the outer surface of stator assembly 12 and opening 86 to facilitate enabling air to flow from housing 18 and along the outer surface of stator assembly 12. Furthermore, a plurality of air channels 88 are formed within stator assembly 12. Each air channel 88 is defined between an adjacent pair of poles 38 and stator yoke 28. Air channels 88 facilitate enabling air to flow from housing 18 and through an inner portion of stator assembly 12 to facilitate cooling electrical machine 10 during operation.

Figure 6:
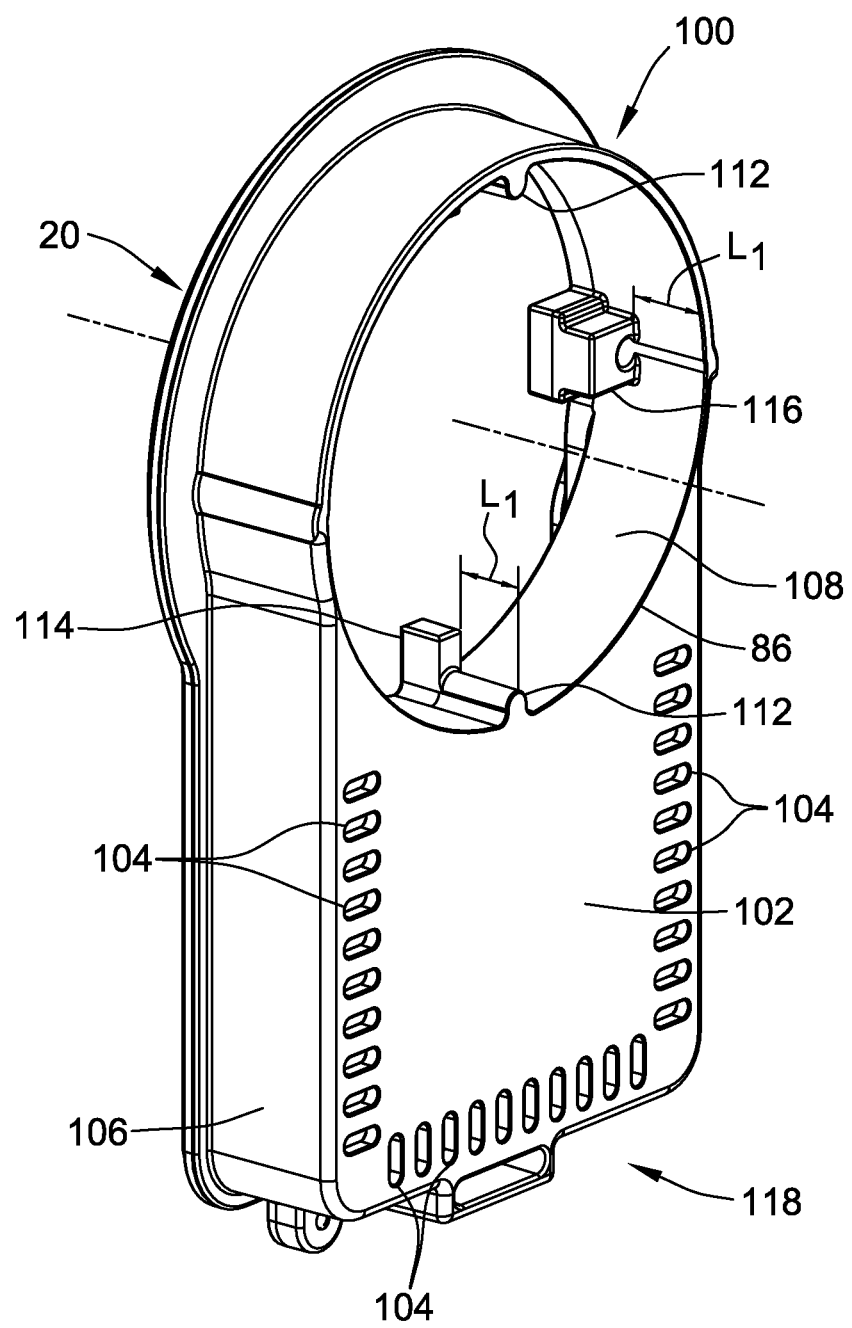
FIG. 6 is a front schematic perspective of the vented base of the housing shown in FIG. 1.
Figure 7:
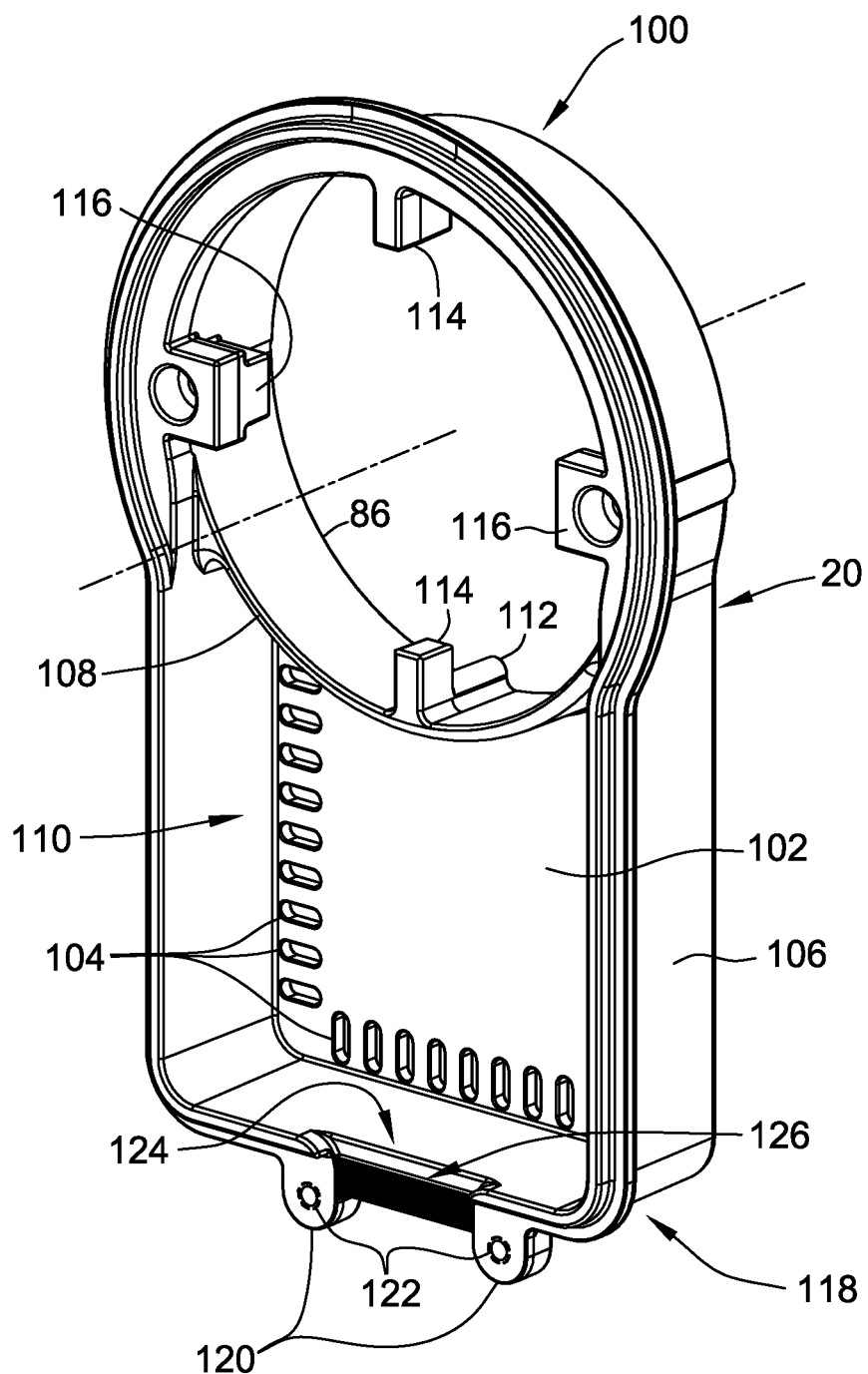
FIG. 7 is a rear schematic perspective of the vented base shown in FIG. 6.

FIG. 6 is a front schematic perspective of vented base 20 of housing 18 shown in FIG. 1. FIG. 7 is a rear schematic perspective of vented base 20 shown in FIG. 6. In the exemplary embodiment, vented base 20 is generally rectangular in shape having a curved upper end 100 with circular opening 86 defined therein. A front wall 102 extends downward from curved upper end 100 and has a plurality of vent openings 104 defined therethrough about a perimeter of front wall 102. In the exemplary embodiment, vent openings 104 are shaped as slots having semicircular ends. Alternatively, vent openings 104 can be any shape and size that enables electrical machine 10 to function as described herein. In the exemplary embodiment, a peripheral sidewall 106 extends substantially perpendicular to front wall 102 and extends about the entire periphery of vented base 20. A flange extends outward and perpendicular from peripheral sidewall 106 at an edge away from front wall 102. Vented base 20 also includes a curved wall 108 extending substantially perpendicular to front wall 102 about at least a portion of opening 86, thereby defining a pocket 110 for enclosing a portion of control electronics board 16.

In the exemplary embodiment, vented base 20 includes a pair of bosses 112 that extend from front wall 102 along the length of peripheral sidewall 106 and curved wall 108. Each of bosses 112 extend radially inward from one of sidewall 106 and curved wall 108 into opening 86. Each of bosses 112 is configured to engage a discrete external groove 34 of stator yoke 28. This facilitates rotationally fixing stator assembly 12 in place with respect to vented base 20. In addition, each of bosses 112 include a radially inward extending portion 114 configured to engage a portion of stator assembly 12 to locate it in an axial direction. Portions 114 extend from a predefined distance $L_1$ to the extent of peripheral sidewall 106 and curved wall 108.

In addition, within opening 86, is a pair of bosses mounting bosses 116. Each boss 116 includes a hole extending axially therethrough to receive an assembly fastener (not shown) of electrical machine 10. Each boss 116 extends from a predefined distance $L_1$ to the extent of peripheral sidewall 106 and curved wall 108. Thus, each boss 116 and each potion 114 of bosses 112 cooperate to locate stator assembly axially a distance $L_1$ with opening 86 of vented base 20.

Extending from a lower end 118 of vented base 20 are two tabs 120, each having a threaded hole 122 extending therethrough. Located between tabs 120 is a wire routing channel 124. Channel 124 includes a plurality of grooves 126 formed therein to facilitate holding one or more wires (not shown) in place within channel 124. In at least some embodiments, vented base 20 is manufactured from iron, steel, non-ferrous metal, and/or molded plastic. Vented base 20, however, may be fabricated from any material that enables electric machine 10 to function as described herein. Furthermore, vented base 20 may be stamped, forged, drawn, or formed using any other suitable manufacturing process to fabricate vented base 20.

Figure 8:
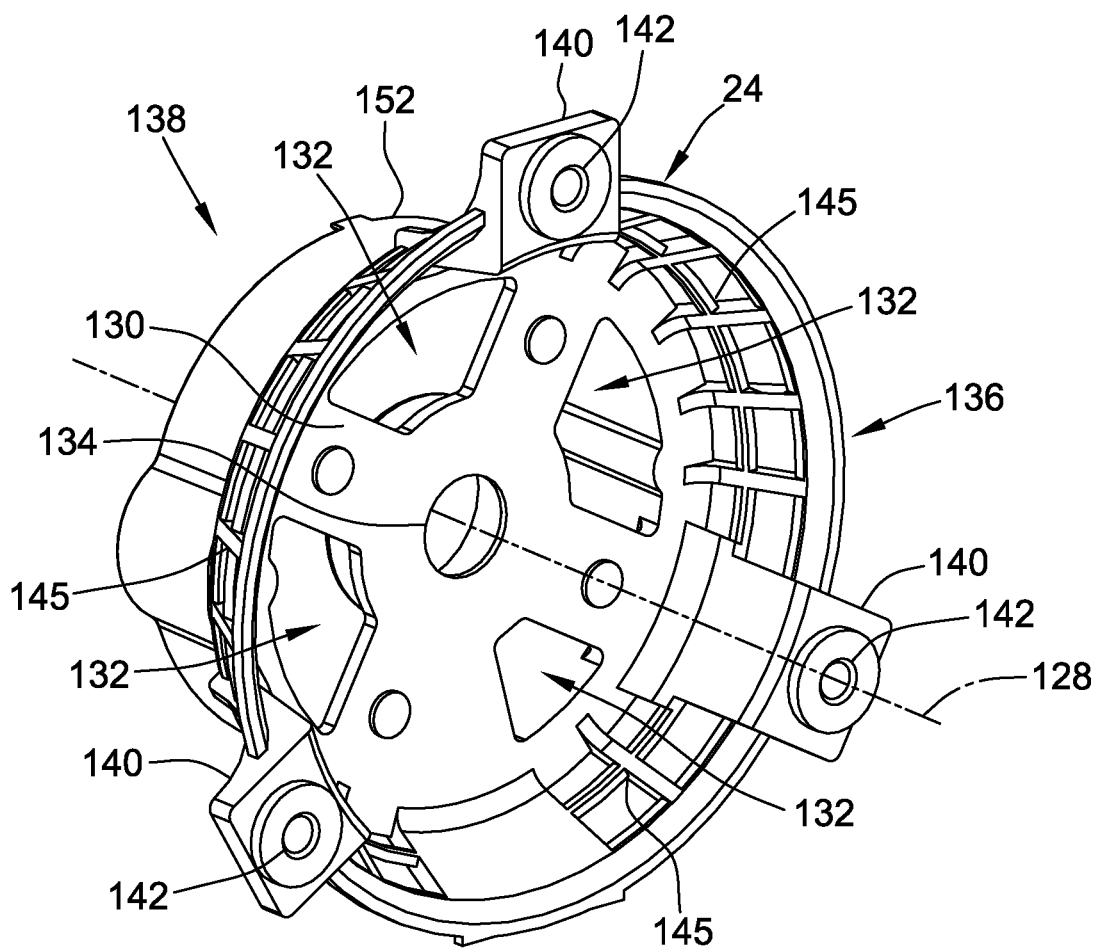
FIG. 8 is a front schematic perspective of a fan guard of the electrical machine shown in FIG. 1.
Figure 9:
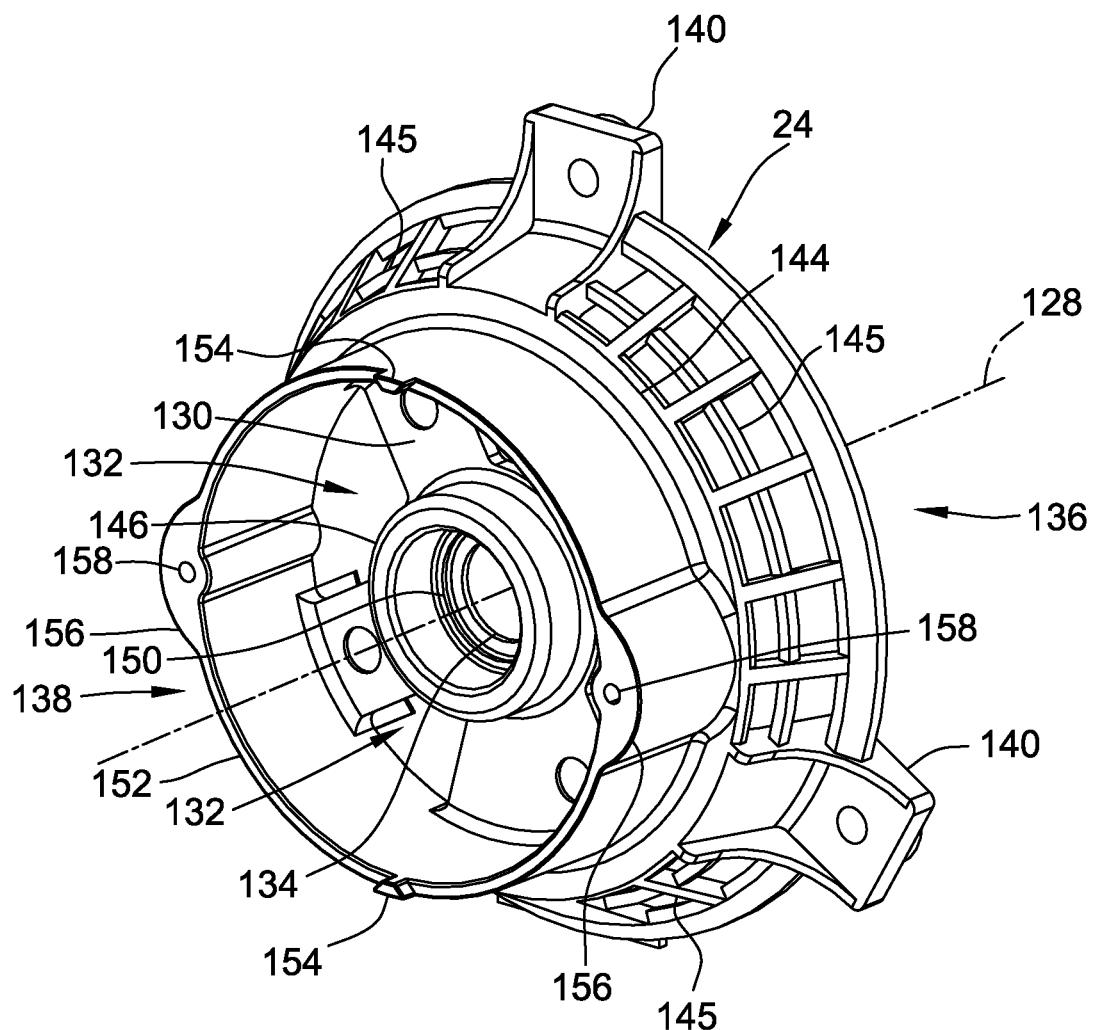
FIG. 9 is a rear schematic perspective of the fan guard shown in FIG. 8.

FIG. 8 is a front schematic perspective of fan guard 24 shown in FIG. 1. FIG. 9 is a rear schematic perspective of fan guard 24 shown in FIG. 8. In the exemplary embodiment, fan guard 24 is generally tubular defining a central axis 128. Fan guard 24 includes a substantially flat central wall 130 that is positioned perpendicular to axis 128. Central wall 130 includes a plurality of openings 132 to facilitate axial air flow through fan guard 24. Central wall 130 also includes a center hole 134 to enable rotatable shaft 46 (shown in FIG. 1) to pass through. At a forward side 136 of fan guard 24, there are three L-shaped mounting brackets 140, each having a hole 142 defined therethrough that is substantially parallel to axis 128. Alternatively, fan guard 24 can have any number of mounting brackets that enable electrical machine 10 to function as described herein. In the exemplary embodiment, mounting brackets 140 are equispaced about a peripheral edge 144 of central wall 130. An arcuate lattice wall 145 extends from peripheral edge 144 of central wall 130 radially outward and axially forward toward forward side 136 forming an frustoconical-shaped open framework of material configured to enable air to pass through while facilitating preventing physical contact with fan 60 (shown in FIG. 1) by outside objects, such as a user's hand.

In the exemplary embodiment, on a rear side 138 of fan guard 24, central wall 130 includes a bearing seat 146 configured to receive bearing 52 (shown in FIG. 2), spring 54 (shown in FIG. 2), and a spring plate 148 (shown in FIG. 2). Spring plate 148 is configured to sit flush against a lip 150 in bearing seat 146. Spring 54 is positioned against spring plate 148 and bearing 52 is slidably coupled to bearing seat 146. In operation, a shaft clip (not shown) coupled to rotatable shaft 46 (shown in FIG. 1) enables an axial force to be applied to bearing 52. Spring 54 provides an opposite force to bearing 52 to facilitate reducing axially movement of bearing 52. In this manner, bearing noise can be reduced and the service life of bearing 52 can be extended.

Extending from peripheral central wall 130 toward rear side 138 and offset radially outward from bearing seat 146 is a substantially circular sidewall 152 configured to enclose at least a portion of stator assembly 12. Sidewall 152 is sized to have an outside dimension substantially similar to the dimension of the outer surface of stator yoke 28. In this manner, stator yoke 28 of stator assembly 12 will sit flush against sidewall 152. Sidewall 152 includes at two tabs 154 that extend axially from sidewall 152 and are configured to engage a discrete external groove 34 of stator yoke 28. This facilitates rotationally fixing stator assembly 12 in place with respect to fan guard 24.

Furthermore, in the exemplary embodiment, sidewall 152 includes a pair of attachment bosses 156. Each boss 156 extends axially from central wall 130 to the extent of sidewall 152 and includes a threaded hole extending axially therein to receive an assembly fastener (not shown) of electrical machine 10. In at least some embodiments, fan guard 24 is manufactured from iron, steel, non-ferrous metal, and/or molded plastic. Fan guard 24, however, may be fabricated from any material that enables electric machine 10 to function as described herein. Furthermore, fan guard 24 may be stamped, forged, drawn, or formed using any other suitable manufacturing process to fabricate fan guard 24.

Figure 10:
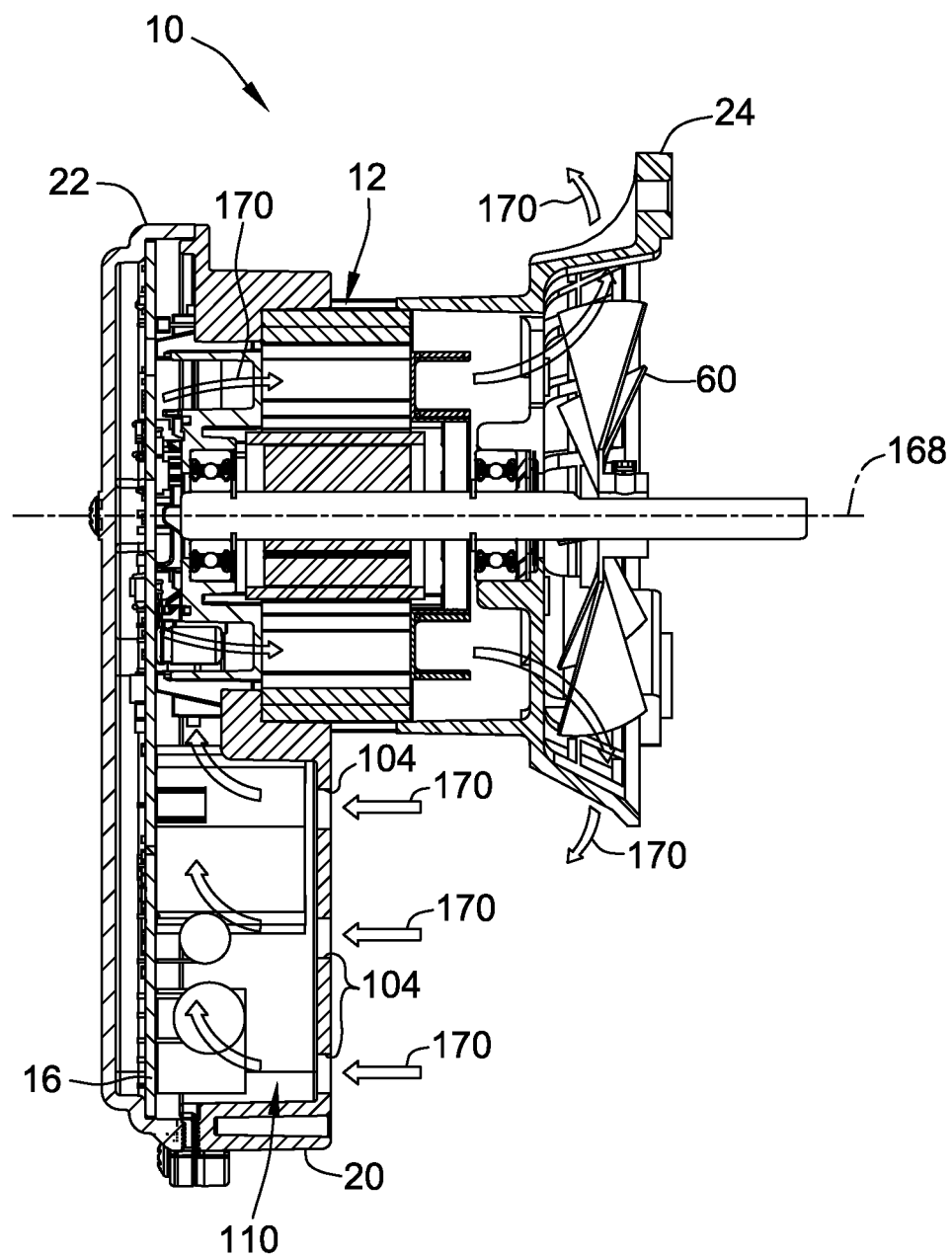
FIG. 10 is a schematic section of the electrical machine taken about line 10-10 shown in FIG. 1.

FIG. 10 is a schematic section of electrical machine 10 taken about line 10-10 shown in FIG. 1. Referring to FIGS. 3, 4, and 10, control electronics board 16 is substantially planar and has a shape substantially similar to the shape of vented base 20 of housing 18. An upper portion 160 of control electronics board 16 includes a plurality of connection interfaces 166 and fork pins 74 for interfacing with stator assembly 12. A lower portion 162 of control electronics board 16 includes a plurality of heat making components 164, including, for example, without limitation, a bridge rectifier and a common mode choke. Heat making components 164 are configured to be enclosed in pocket 110 (shown in FIG. 7) of vented base 20 of housing 18.

In the exemplary embodiment, control electronics board 16 is mounted to closure 22 of housing 18. Closure 22 has a peripheral shape substantially the same as vented base 20 and includes a wall with an axially extending peripheral lip 172. Closure 22 also includes a pair of tabs 174 substantially complementary to tabs 120 (shown in FIG. 7), and a wire routing channel 176 located between tabs 174. Each of tabs 174 include a hole 178 therethrough for receiving an assembly fastener (not shown). Closure 22 is coupled to vented base 20 to form housing 18. Control electronics board 16 is enclosed within housing 18 with heat making components 164 located in pocket 110.

Referring to FIG. 10, in operation, electrical machine 10 is operated by control electronics board 16. That is, the windings (not shown) of stator assembly 12 are energized in a predetermined sequence by control electronics board 16. The windings facilitate generating a radial magnetic field that moves in one of a clockwise and a counterclockwise direction around stator assembly 12, depending on the pre-determined sequence in which the windings are energized. The moving magnetic field intersects with a flux field generated by the permanent magnets (not shown) of rotor 44 to generate a torque that causes rotor assembly 14 to rotate about a rotation axis 168 relative to stator assembly 12. The generated torque is a direct function of the strength, or intensity, of the magnetic field interactions between the windings and the permanent magnets. Because rotor assembly 14 is coupled directly to fan 60, rotation of rotor assembly 14 facilitates rotation of fan 60.

As fan 60 rotates, it draws air through electrical machine 10, the arrows denoting air flow 170 through electrical machine 10. Air flow 170 enters pocket 110 of vented base 20 in a substantially axial direction through one or more of vent openings 104. Air flow 170 enters vent openings 104 and impinges on control electronics board 16 and heat making components 164, where it provides cooling through convection. Air flow 170 is then drawn from pocket 110 where it turns approximately 90 degrees and flows along control electronics board 16 toward stator assembly 12. Air flow 170 is then drawn through stator assembly 12, turning another 90 degrees such that air flow 170 is flowing substantially axially in the opposite direction as when air flow 170 entered vent openings 104. Air flow 170 facilitates cooling stator assembly 12 by convection as it flows along the windings and stator yoke 28. Air flow 170 vents through lattice wall 145 and/or axially from fan guard 24. Venting air flow 170 proximate to fan 60 facilitates eliminating downstream interference and facilitates reducing the pressure drop for the cooling system. Such efficient venting of air flow 170 increases the heat transfer between electrical machine 10 and air flow 170 by providing a low-resistance path for air flow 170 to leave electrical machine 10 at the location of fan 60. In an alternative embodiment, a duct (not shown) is coupled to fan guard 24 to channel air flow 170 away from electrical machine 10.

Figure 11:
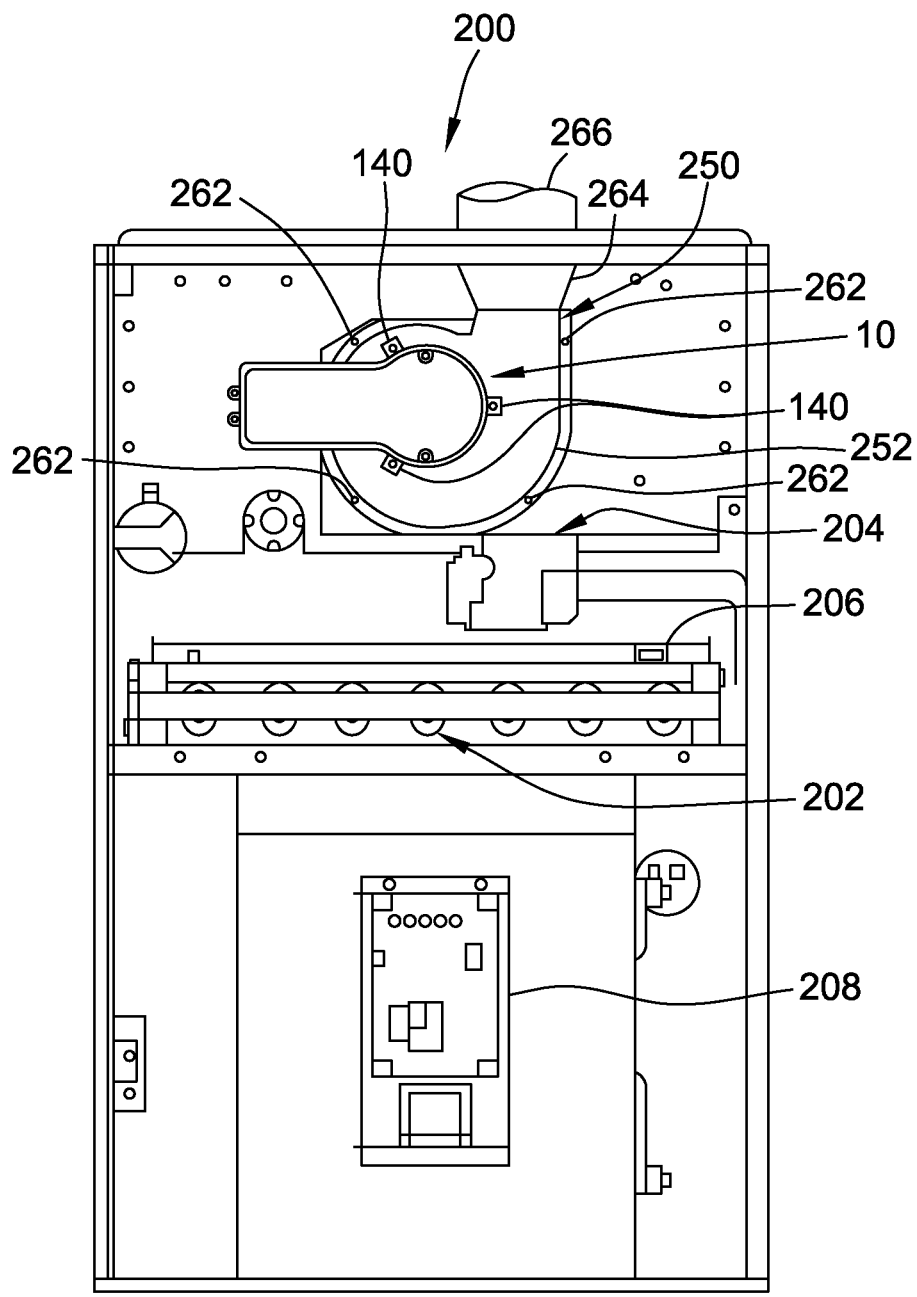
FIG. 11 is an exemplary furnace including the electrical machine shown in FIG. 1.
Figure 12:
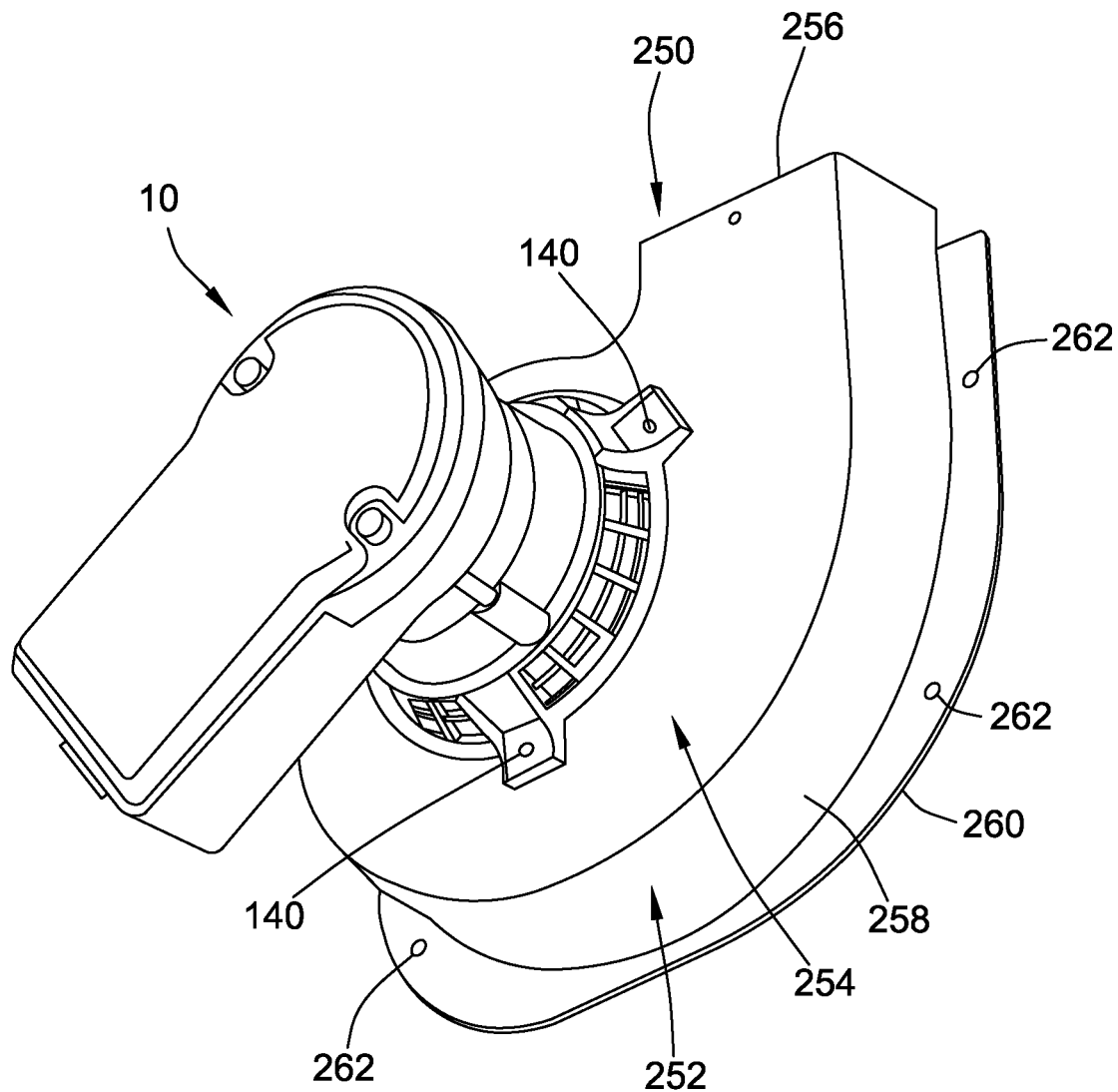
FIG. 12 is a schematic perspective of the electrical machine shown in FIG. 1 coupled to a blower assembly.

FIG. 11 is an exemplary furnace system 200 including electrical machine 10. FIG. 12 is a schematic perspective of electrical machine 10 shown in FIG. 1 coupled to a blower assembly 250. In the exemplary embodiment, furnace system 200 is a low power, multistate, non-condensing furnace. For example, without limitation, furnace system 200 can be an 80% annual fuel utilization efficiency furnace. Furnace system 200 comprises electrical machine 10, which is also referred to as a draft inducer, a plurality of gas burners 202, a gas valve 204, and an igniter 206. Draft inducer 10 draws combustion gasses from furnace system 200. A control panel 208 provides operation and potential diagnostics of furnace system 200.

Draft inducer 10 is coupled to blower assembly 250 by L-shaped mounting brackets 140 using a plurality of mounting fasteners (not shown), for example, without limitation, nut and bolt combinations, sheet metal fasteners, rivets, and the like. In the exemplary embodiment, blower assembly 250 includes a scroll-shaped, or curved outer housing 252 having a substantially flat top panel 254 including a generally circular portion, and a generally rectangular extension 256. Alternatively, blower assembly 250 includes any number of shapes and configurations that enable blower assembly 250 to function as described herein.

In the exemplary embodiment, outer housing 252 includes a generally axially extending sidewall 258 that terminates with an outward extending flange 260. Flange 260 is substantially parallel to top panel 254 and includes a plurality of openings 262 configured to receive a mechanical fastener (not shown) for mounting blower assembly 250 to furnace system 200. In operation, heated air from the plurality of burners 12 is drawn into blower assembly 250 through an opening (not shown) opposite draft inducer 10. The heated air is blown from blower assembly 250 and exits through extension 256. In the exemplary embodiment, a conduit 264 provides a transition between extension 256 of blower assembly 250 and an exhaust duct 266. Conduit 264 is coupled to extension 256 by, for example, without limitation, nut and bolt combinations, sheet metal fasteners, rivets, and the like.

The present disclosure provides an electrical machine with improved structural configurations that improves the cooling air flow entering, passing through, and exiting of the electrical machine. More specifically, an electrical machine is disclosed that includes a fan driven by the electrical machine for drawing air into a control electronics housing from around the stator assembly of the electrical machine. The electrical machine includes a substantially planar control electronics board coupled axially away the stator assembly and having the heat making components positioned radially outward from the stator assembly. The heat making components of the control electronics board extend axially along the stator assembly which enables a low profile housing to cover at least a portion of the electrical machine and the control electronics board such that the housing extends a minimal distance from the rear portion of the stator assembly. As such, the electrical machine takes up less space within an air moving system, such as a draft inducer or furnace assembly, and provides for additional space for additional system components. Furthermore, the electrical machine contains fewer overall components, which provides for an electrical machine that is less expensive and easier to assemble than other known electrical machines. In addition, the electrical machine defines a continuous air flow channel between the vent openings and the fan guard lattice framework to facilitate efficiently cooling both the control electronics board and the stator assembly of the electrical machine using a single fan.

The apparatus, methods, and systems described herein provide a compact electrical machine having an improved cooling air flow distribution through the electrical machine. One advantage to positioning the heat making components of the control electronics board of the electrical machine radially outward of the stator assembly includes facilitating reducing the axial extension of the housing of the control electronics board beyond the stator assembly. Another advantage is that the housing can be arranged such that the air flow can be drawn across the control electronics board and through the stator assembly in a smooth flow path thereby reducing the need for ducts to channel the air flow for proper cooling of the electrical machine. The exemplary embodiments described herein provide apparatus, systems, and methods particularly well-suited for draft inducer motors and systems.

Further, the embodiments described herein relate to draft inducer electrical machine that include integral fans to facilitate cooling the electrical machine. The methods and apparatus are not limited to the specific embodiments described herein, but rather, components of apparatus and/or steps of the methods may be utilized independently and separately from other components and/or steps described herein. For example, the methods may also be used in combination with other electrical machine or blower assemblies, and are not limited to practice with only the electrical machine as described herein. In addition, the embodiment can be implemented and utilized in connection with many other HVAC applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical machine comprising:
   a fan guard positioned at a first end of said electrical machine, said fan guard comprising a first air flow channel therethrough;
   a stator assembly coupled to said fan guard and comprising a stator yoke comprising a cylindrical outer surface and a stator pole shoe comprising a plurality of stator poles coupled to said stator yoke, said stator assembly further comprising a second air flow channel defined between said stator yoke and an adjacent pair of stator poles of said plurality of stator poles;
   a rotor assembly positioned inside said stator assembly, said rotor assembly comprising a rotatable shaft and a rotor coupled thereto, said rotatable shaft defining a rotation axis of said electrical machine;
   a control electronics board comprising a plurality of heat making components; and
   a housing comprising a vented base and a closure, said housing coupled to said stator assembly at a second end of said electrical machine opposite said first end, said housing configured to enclose said control electronics board, wherein said vented base comprises a plurality of vent openings opened toward said first end.

2. The electrical machine in accordance with claim 1, wherein said plurality of vent openings are located adjacent at least a portion of a periphery of said vented base.

3. The electrical machine in accordance with claim 1, wherein said vented base further comprises a substantially circular stator opening configured to receive said stator assembly.

4. The electrical machine in accordance with claim 3, wherein said stator opening is sized to define an air gap between said cylindrical outer surface of said stator yoke and said stator opening, the air gap configured to enable air to exit said housing therefrom.

5. The electrical machine in accordance with claim 3, wherein said vented base further comprises at least one first boss extending radially inward from a sidewall of said stator opening, said at least one first boss configured to engage an external groove formed in said stator yoke.

6. The electrical machine in accordance with claim 3, wherein said vented base further comprises at least one second boss extending radially inward from a sidewall of said stator opening, said at least one second boss configured to engage an end of said stator yoke to locate said stator yoke in an axial direction with respect to the rotation axis.

7. The electrical machine in accordance with claim 1, wherein said fan guard comprises a substantially circular sidewall configured to enclose at least a portion of said stator assembly.

8. The electrical machine in accordance with claim 7, wherein said fan guard further comprises at least one tab extending axially from an end of said sidewall, said at least one tab configured to substantially circular sidewall configured to engage an external groove formed in said stator yoke.

9. The electrical machine in accordance with claim 1, wherein said control electronics board further comprises at least one fork pin, said stator assembly further comprises a rigid insulating support, said rigid insulating support comprises a mag-mate terminal, wherein said fork pin is slidingly coupled to said mag-mate terminal.

10. A furnace system comprising:
    a furnace comprising a plurality of heater elements;
    an electrical machine comprising:
      a fan guard positioned at a first end of said electrical machine, said fan guard comprising a first air flow channel therethrough;
      a stator assembly coupled to said fan guard and comprising a stator yoke and a stator pole shoe comprising a plurality of stator poles coupled to said stator yoke, said stator assembly further comprising a second air flow channel defined between said stator yoke and an adjacent pair of stator poles of said plurality of stator poles;
      a rotor assembly positioned inside said stator assembly, said rotor assembly comprising a rotatable shaft and a rotor coupled thereto, said rotatable shaft defining a rotation axis of said electrical machine;
      a control electronics board comprising a plurality of heat making components; and
      a housing comprising a vented base and a closure, said housing coupled to said stator assembly at a second end of said electrical machine opposite said first end, said housing configured to enclose said control electronics board, wherein said vented base comprises a plurality of vent openings opened toward said first end; and
    a blower assembly coupled to said first end of said electrical machine.

11. The furnace system in accordance with claim 10, wherein said plurality of vent openings are located adjacent at least a portion of a periphery of said vented base.

12. The furnace system in accordance with claim 10, wherein said vented base further comprises a substantially circular stator opening configured to receive said stator assembly.

13. The furnace system in accordance with claim 12, wherein said vented base further comprises at least one first boss extending radially inward from a sidewall of said stator opening, said at least one first boss configured to engage an external groove formed in said stator yoke.

14. The furnace system in accordance with claim 12, wherein said vented base further comprises at least one second boss extending radially inward from a sidewall of said stator opening, said at least one second boss configured to engage an end of said stator yoke to locate said stator yoke in an axial direction with respect to the rotation axis.

15. The furnace system in accordance with claim 10, wherein said fan guard comprises a substantially circular sidewall configured to enclose at least a portion of said stator assembly.

16. The furnace system in accordance with claim 15, wherein said fan guard further comprises at least one tab extending axially from an end of said sidewall, said at least one tab configured to substantially circular sidewall configured to engage an external groove formed in said stator yoke.

17. The furnace system in accordance with claim 10, wherein said control electronics board further comprises at least one fork pin, said stator assembly further comprises a rigid insulating support, said rigid insulating support comprises a mag-mate terminal, wherein said fork pin is slidingly coupled to said mag-mate terminal.

18. A method of assembling an electrical machine, said method comprising:
- providing a fan guard having a first air flow channel formed therethrough;
- coupling a stator assembly to the fan guard, the stator assembly including a stator yoke and a stator pole shoe including a plurality of stator poles coupled to the stator yoke, the stator assembly further including a second air flow channel defined between the stator yoke and an adjacent pair of stator poles of the plurality of stator poles;
- positioning a rotor assembly inside the stator assembly, the rotor assembly including a rotatable shaft defining a rotation axis;
- coupling a housing including a vented base and a closure to the stator assembly opposite the fan guard, wherein the vented base includes a plurality of vent openings opened toward the fan guard;
- coupling a control electronics board within the housing;
- coupling a fan to the rotatable shaft, the fan enclosed by the fan guard; and
- rotating the fan to draw air through the plurality of vent openings, the second air flow channel, and the first air flow channel.

19. The method in accordance with claim 18, wherein coupling the housing including the vented base and the closure to the stator assembly comprises coupling the housing including the vented base and the closure to the stator assembly, wherein the plurality of vent openings are located adjacent at least a portion of a periphery of the vented base.

20. The method in accordance with claim 18 further comprising exhausting the air drawn through the plurality of vent openings, the second air flow channel, and the first air flow channel out through a lattice wall of the fan guard.

\* \* \* \* \*